United States Patent
Wojcik et al.

(10) Patent No.: US 12,160,800 B2
(45) Date of Patent: Dec. 3, 2024

(54) DEVICE, SYSTEM AND METHOD FOR MANAGING TALKGROUPS

(71) Applicant: MOTOROLA SOLUTIONS, INC., Chicago, IL (US)

(72) Inventors: Wojciech Wojcik, Cracow (PL); Grzegorz Gustof, Myslenice (PL); Marcin Michalak, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 17 days.

(21) Appl. No.: 17/768,998

(22) PCT Filed: Dec. 5, 2019

(86) PCT No.: PCT/PL2019/050073
§ 371 (c)(1),
(2) Date: Apr. 14, 2022

(87) PCT Pub. No.: WO2021/112696
PCT Pub. Date: Jun. 10, 2021

(65) Prior Publication Data
US 2024/0107274 A1     Mar. 28, 2024

(51) Int. Cl.
*H04W 4/08*     (2009.01)
*H04W 4/10*     (2009.01)

(52) U.S. Cl.
CPC .............. *H04W 4/08* (2013.01); *H04W 4/10* (2013.01)

(58) Field of Classification Search
CPC ........... H04W 4/06; H04W 4/08; H04W 4/10; H04W 4/30; H04W 4/90; H04W 84/10; H04W 84/18
See application file for complete search history.

(56) References Cited

U.S. PATENT DOCUMENTS

| | | | |
|---|---|---|---|
| 5,613,209 A | 3/1997 | Peterson et al. | |
| 6,204,844 B1 | 3/2001 | Fumarolo et al. | |
| 6,564,066 B1 | 5/2003 | Biggs et al. | |
| 6,643,262 B1 | 11/2003 | Larsson et al. | |

(Continued)

FOREIGN PATENT DOCUMENTS

| | | | |
|---|---|---|---|
| WO | 2018102729 A1 | 6/2018 | |
| WO | 2019132682 A1 | 7/2019 | |

OTHER PUBLICATIONS

"International Search Report", mailed Aug. 6, 2020, issued in corresponding PCT Application No. PCT/PL2019/050073, Filed Dec. 5, 2019.

*Primary Examiner* — Quochien B Vuong
(74) *Attorney, Agent, or Firm* — PERRY + CURRIER, INC.

(57) ABSTRACT

A device, system and method for managing talkgroups is provided. A computing device determines that a communication device is communicating with a talkgroup via a first communication network, the talkgroup dominated by other communication devices communicating on one or more second communication networks different from the first communication network. The computing device determines a level of activity of the communication device in the talkgroup via the first communication network. When the level of activity meets a threshold condition, the computing device: requests a confirmation from the communication device to cease communication with the talkgroup; and when the confirmation is received, drops the communication device from the talkgroup.

20 Claims, 7 Drawing Sheets

(56) References Cited

U.S. PATENT DOCUMENTS

| | | |
|---|---|---|
| 6,912,401 B2 | 6/2005 | Rosen et al. |
| 7,751,348 B2 * | 7/2010 | Shaffer ............... H04L 65/4061 |
| | | 455/518 |
| 8,195,215 B2 | 6/2012 | Marocchi et al. |
| 8,805,431 B2 | 8/2014 | Vasavada et al. |
| 9,232,362 B2 | 1/2016 | Bekiares |
| 9,525,982 B2 * | 12/2016 | Chandler ................ H04W 4/10 |
| 9,591,133 B2 | 3/2017 | Agulnik et al. |
| 9,686,665 B2 | 6/2017 | Igumnov et al. |
| 9,730,026 B2 | 8/2017 | Wawrowski et al. |
| 10,257,740 B2 | 4/2019 | McDonald et al. |
| 10,764,725 B1 * | 9/2020 | Lim ...................... H04W 84/18 |
| 2003/0012143 A1 | 1/2003 | Chen et al. |
| 2007/0082690 A1 * | 4/2007 | Fabien .................. H04W 72/30 |
| | | 455/518 |
| 2007/0104121 A1 | 5/2007 | Shaffer et al. |
| 2007/0136372 A1 | 6/2007 | Proctor et al. |
| 2009/0312045 A1 | 12/2009 | Miller et al. |
| 2014/0243034 A1 | 8/2014 | Gurney et al. |
| 2017/0034672 A1 | 2/2017 | Pai et al. |

\* cited by examiner

DEVICE, SYSTEM AND METHOD FOR MANAGING TALKGROUPS

BACKGROUND OF THE INVENTION

First responders sometimes use talkgroup enabled devices to communicate on a talkgroup outside their usual communication network, for example when travelling. Hence a device may communicate with the talkgroup via another communication network (e.g. a current network different from their usual communication network) which may unduly use bandwidth at the other communication network.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
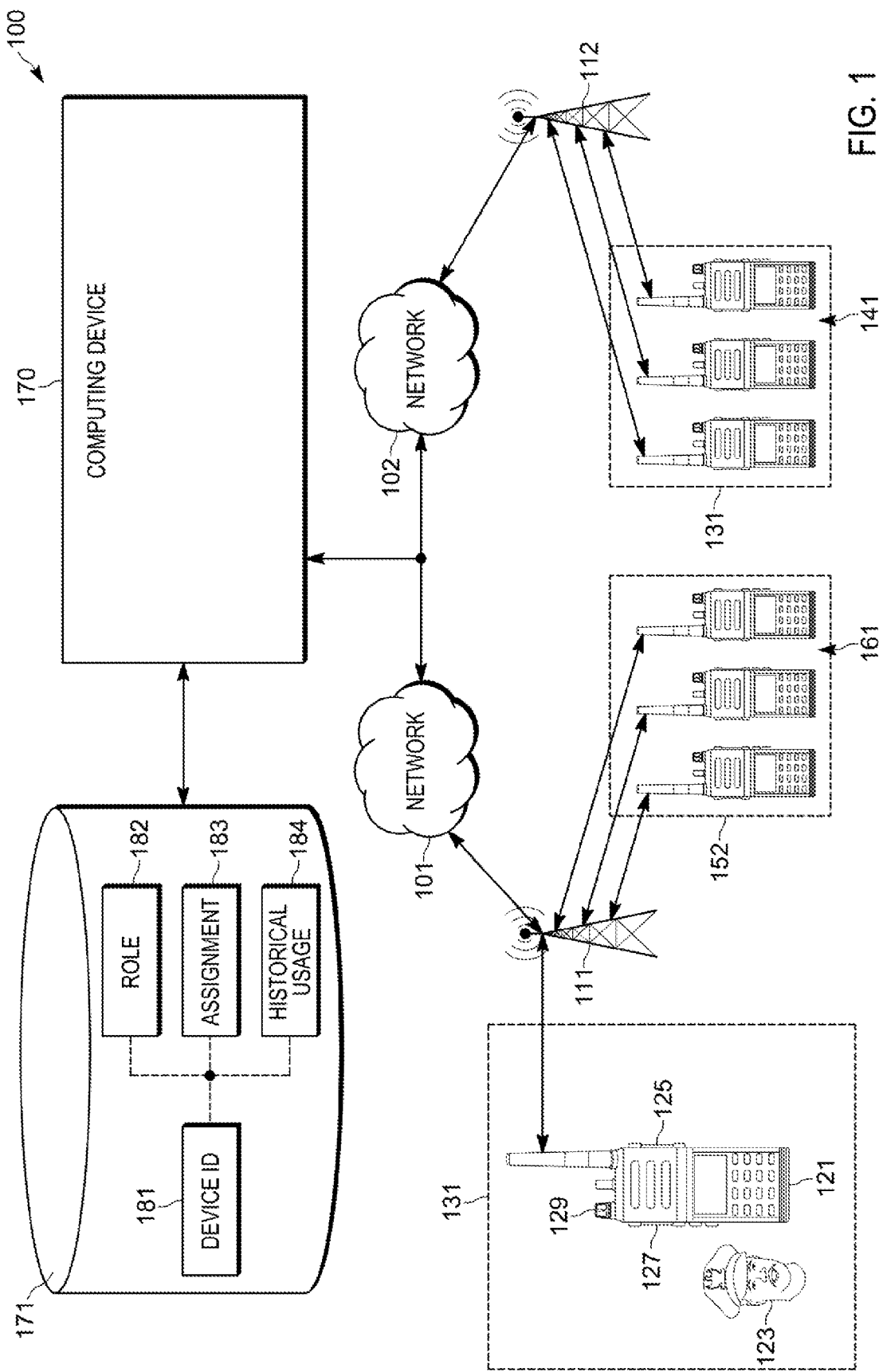
FIG. 1 is a system for managing talkgroups, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

First responders sometimes use talkgroup enabled devices to communicate on a talkgroup outside their usual communication network, for example when travelling. Hence a device may communicate with the talkgroup via another communication network (e.g. a current network different from their usual communication network) which may unduly use bandwidth at the other communication network.

For example, when travelling, a first responder may have their device set to communicate on a default talkgroup which utilizes bandwidth in a current network where they are travelling. In general the default talkgroup may primarily communicate on a network different from the current network. The first responder may or may not know that their device is communicating using the default talkgroup on the current network. For example, the first responder may have meant to turn off their device when travelling, but did not, in which case the device maintains wireless communication with the talkgroup wasting bandwidth on channel with a base station of the current network. Alternatively, the first responder may have operated the device to unintentionally select a "wrong" talkgroup (e.g. a talkgroup that primarily communicates on a network different from a current network). In either instance, the device may communicate on a talkgroup that primarily communicates on a network different from a current network, thereby wasting bandwidth on the current network.

An aspect of the present specification provides a method comprising: determining, at a computing device, that a communication device is communicating with a talkgroup via a first communication network, the talkgroup dominated by other communication devices communicating on one or more second communication networks different from the first communication network; determining, at the computing device, a level of activity of the communication device in the talkgroup via the first communication network; and when the level of activity meets a threshold condition: requesting, via the computing device, a confirmation from the communication device to cease communication with the talkgroup; and when the confirmation is received, dropping, via the computing device, the communication device from the talkgroup.

Another aspect of the present specification provides a computing device comprising: communication unit; and a controller configured to: determine that a communication device is communicating with a talkgroup via a first communication network, the talkgroup dominated by other communication devices communicating on one or more second communication networks different from the first communication network; determine a level of activity of the communication device in the talkgroup via the first communication network; and when the level of activity meets a threshold condition: request a confirmation from the communication device to cease communication with the talkgroup; and when the confirmation is received, drop the communication device from the talkgroup.

Attention is directed to FIG. 1, which depicts an example system 100 for managing talkgroups, in accordance with some examples. The system 100 comprises a first communication network 101 and a second communication network 102 in communication via any suitable communication link. Communication links between components of the system 100 are depicted in FIG. 1, and throughout the present specification, as double-ended arrows between respective components; the communication links may include any suitable combination of wireless and/or wired links and/or wireless and/or wired communication networks. Hence, the first communication network 101 and the second communication network 102 (interchangeably referred to hereafter, respectively, as the network 101 and the network 102), are configured to communicate with each other. The networks 101, 102 are understood to be different from one another. For example, the first network 101 may provide coverage for a first geographic area and the second network 102 may provide coverage for a second geographic area different from the first geographic area.

As depicted, the system 100 further comprises a first base station 111 and a second base station 112. The base stations 111, 112 may each comprise a respective combination of one or more antennas and one or more transceivers (e.g. which may be components of computing devices for managing wireless communications with devices in wireless communication with a respective base station 111, 112). In particular, the first base station 111 provides wireless communications with the first network 101 and the second base station 112 provides wireless communications with the second network 102. Furthermore while only one base station 111, 112 is depicted as providing wireless communication for a respective network 101, 102, it is understood that the system 100 may comprise a plurality of respective base stations 111, 112 providing wireless communication for a respective network 101, 102.

The system 100 further comprises a communication device 121 that is communicating via the first communication network 101, for example via the first base station 111. As depicted, the communication device 121 (interchangeably referred to hereafter as the device 121) is being operated by a user 123 (e.g. a first responder, as depicted a police officer). The device 121 is generally configured to communicate on talkgroups, as described in more detail below. While the device 121 is depicted as a hand-held radio, the device 121 may comprise any suitable devices configured to communicate on talkgroups including, but not limited to, vehicular communication devices (e.g. a radio installed at a vehicle, including, but not limited to a first responder vehicle, such as a police car).

As depicted, the device 121 comprises one or more hardware devices associated with communication on talkgroups. For example, as depicted, the device 121 comprises a push-to-talk (PTT) button 125, one or more volume control devices 127 and a talkgroup selection knob 129. The knob 129 may be used to select a talkgroup, the PTT button 125 may be used to initiate an outgoing communication on a selected talkgroup, and the one or more volume control devices 127 may be used to control volume on the selected talkgroup, for example to control volume of received communications at a speaker of the device 121. When a talkgroup is selected, for example, the device 121 generally receives any communications on the selected talkgroup, for example from other communication devices on the talkgroup, and may transmit communications on the selected talkgroup, for example when the PTT button 125 is pressed.

As depicted, the device 121 is understood to be communicating with a talkgroup 131 via the first communication network 101. The talkgroup 131 may be a default talkgroup for the device 121 and/or the talkgroup 131 may be a talkgroup selected at the device 121 via the knob 129.

In particular, the talkgroup 131 is dominated by other communication devices 141 (interchangeably referred to hereafter as the devices 141 and/or as a device 141) communicating on the second communication network 102 different from the first communication network 101. For example, while the device 121 is using the first network 101 to communicate on the talkgroup 131, the majority of the devices 141 use the second network 102 to communicate on the talkgroup 131. Hence, the talkgroup 131 may be "dominated" by the other communication devices 141) communicating on the second communication network 102. Put another way, a talkgroup may be referred to as being dominated by a first group of communication devices on a particular network, for example at a given time, when the first group comprises a majority of the communication devices of the talkgroup; for example, a second group of devices of the talkgroup may use one or more other communication networks to communicate on the talkgroup, with the second group being smaller than the first group.

For example, the user 123 may "normally" (e.g. most often) be geographically located such that communications on the talkgroup 131, by the device 121, occur via the second network 102. Hence, the second network 102 may alternatively be referred to as a home communication network. Hence, communications with the other devices 141 on the talkgroup 131, by the device 121, may most often occur local to the second network 102 for example via the second base station 112.

However, it is understood in FIG. 1 that the user 123 has travelled with the device 121 to a geographic area serviced by the first network 101, for example due to personal travel, business travel (e.g. prisoner transport), and/or any other suitable reason. It is further understood in FIG. 1 that the device 121 maintains communications with the talkgroup 131 via the first network 101; for example, the device 121 maintains communications with the talkgroup 131 via: a radio channel and/or wireless communication link with the first base station 111; the first network 101; communication links between the networks 101, 102; the second network 102; the second base station 112; and a respective radio channel and/or wireless communication links between the second base station 112 and the other devices 141. As such, considerable bandwidth may be used to maintain communications for the device 121 with the talkgroup 131 via the first network 101.

In particular, as depicted, the system 100 comprises another talkgroup 152 (e.g. the talkgroup 131 may alternatively be referred to as the first talkgroup 131, and the another talkgroup 152 may alternatively be referred to as the second talkgroup 152). The talkgroup 152 may be between communication devices 161 via the first base station 111 and the first network 101. The communication devices 161 may normally (e.g. most often) be located such that communications on the talkgroup 152, by the devices 161, occur via the first network 101. In a particular example, the devices 121, 141 may be associated with a first entity, such as a police department of a given city, and the like, and the devices 161 may be associated with a second entity, such as another police department of another given city, and the like. Hence, as depicted, the device 121 may be roaming to a geographic area where the devices 161 are normally communicating. As such, bandwidth used by the device 121 may interfere with communications by the devices 161 on the talkgroup 152.

As depicted, the system 100 further comprises a computing device 170 which is configured to communicate with the networks 101, 102 and/or the devices 121, 141, and optionally the devices 161, via any suitable communication links. The computing device 170 generally configured to monitor activity of at least the device 121 (and optionally the devices 141, 161), and to control and/or cause at least the device 121 to be dropped from a talkgroup, as described hereafter. In some examples, the computing device 170 may be operated by the entity with which the devices 121, 141 are associated. However, the computing device 170 may be associated with any entity associated with of any of the devices 121, 141, 161.

In the depicted example, the computing device 170 may have access to a database 171. The database 171 may comprise any suitable database and/or memory, and associations between data stored at the database 171 are indicated via dashed lines. While the database 171 is depicted as separate from the computing device 170, the database 171 may alternatively be stored at a memory of the computing device 170 and/or data depicted as being stored at the database 171 may be stored at a memory of the computing device 170.

For example, as depicted, the database 171 stores an identifier 181 of the device 121, and one or more of an associated role 182 and an associated current assignment 183 of the user 123. For example, the role 182 (e.g. data indicating a role of the user 123) may indicate a position of the user 123 in an organizational hierarchy (e.g. patrol officer or a captain), while the assignment 183 (e.g. data indicating a current assignment of the user 123) may indicate a current activity to which the user 123 is assigned (e.g. off-duty or prisoner transport).

As depicted, the database 171 further stores historical usage 184 of the talkgroup 131 by the device 121 via the second communication network 102. For example, historical usage 184 may include data indicating usage of the talkgroup 131 by the device 121. For example, the historical usage 184 may comprise numbers of minutes, and the like, that the device 121 has communicated using the talkgroup 131, for example a total number of minutes and/or broken down by time periods, such as daily usage, and the like. In some examples, the historical usage 184 may include usage of the talkgroup 131 by the device 121 for outgoing communications (e.g. communications transmitted by the device 121) and/or usage of the talkgroup 131 by the device 121 for incoming communications (e.g. communications received by the device 121)

The data at the database 171 may be maintained by the entity operating the computing device 170 and/or the database 171. Furthermore, while the database 171 is depicted as storing only one set of data associated with the device 121 and/or the user 123, the database 171 may store similar sets of data associated with the devices 141 and/or the devices 161.

As will be described hereafter, the computing device 170 may monitor and/or determine activity of the communication device 121 in the talkgroup 131 via the first communication network 101; and, when the level of activity meets a threshold condition, the computing device 170 may drop the communication device 121 from the talkgroup 131. In some examples, as described below, confirmation may be requested prior to dropping the communication device 121 from the talkgroup 131. In some examples, a type of the activity on the talkgroup and/or the threshold condition may be based on one or more of the role 182 of user 123 and the current assignment 183, for example as stored at the database 171. In some examples, activity on the talkgroup and/or the threshold condition may be based on the current usage and/or the historical usage 184, for example as stored at the database 171

Figure 2:
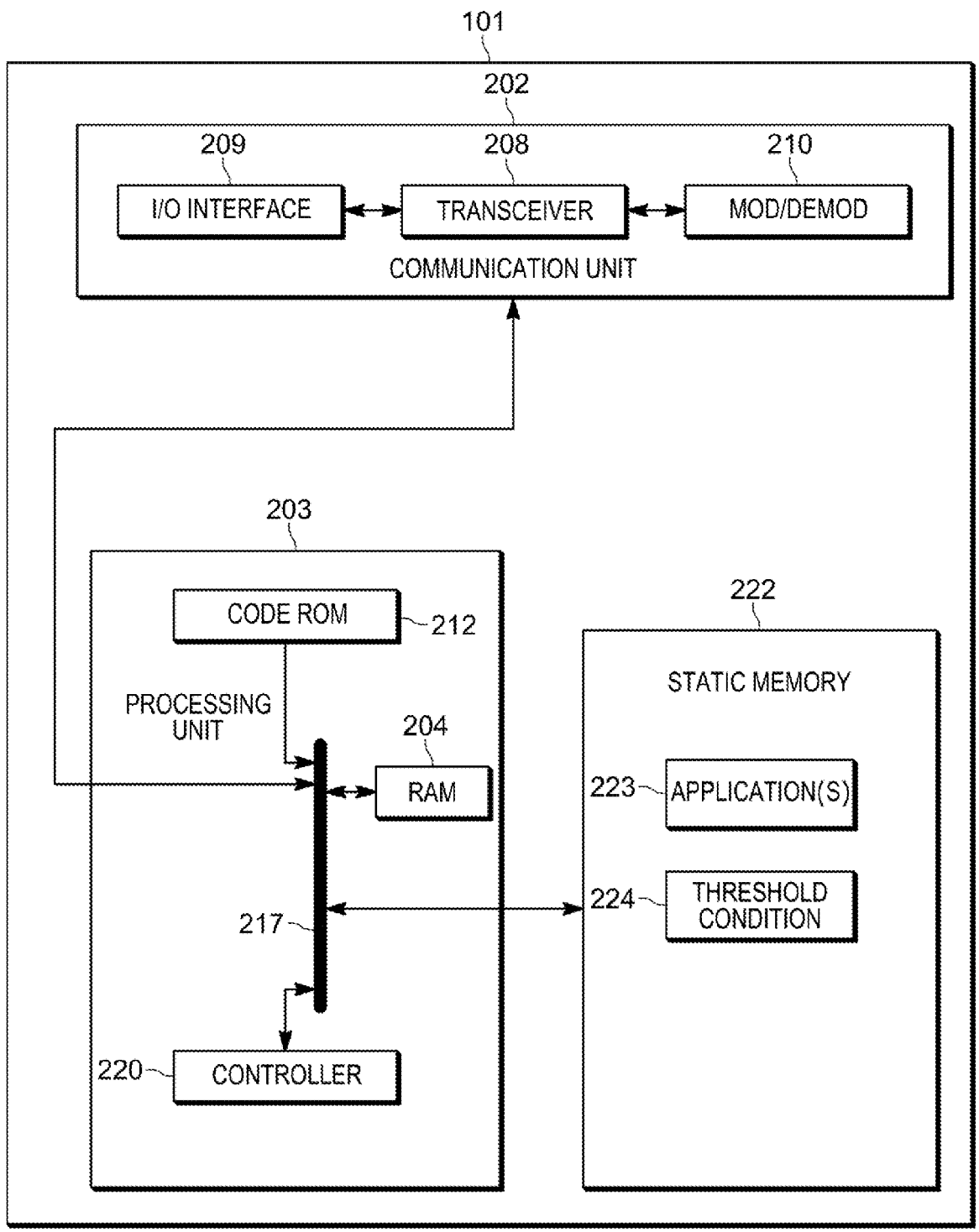
FIG. 2 is a device diagram showing a device structure of a computing device for managing talkgroups, in accordance with some examples.

Attention is next directed to FIG. 2, which depicts a schematic block diagram of an example of the computing device 170.

In general, the computing device 170 may comprise a server and/or cloud-based computing device comprising: a communication unit 202, a processing unit 203, a Random-Access Memory (RAM) 204, one or more wireless transceivers 208, one or more wired and/or wireless input/output (I/O) interfaces 209, a combined modulator/demodulator 210 (the transceiver(s) 208 coupled to the combined modulator/demodulator 210), a code Read Only Memory (ROM) 212, a common data and address bus 217, a controller 220, and a static memory 222 storing at least one application 223. Hereafter, the at least one application 223 will be interchangeably referred to as the application 223. Furthermore, each of the memories 212, 222 comprise non-transitory memories and/or non-transitory computer readable mediums. In some examples, memory 222 comprises the database 171.

While not depicted, the computing device 170 may further comprise, and/or be in communication with, one or more input devices, a display screen and the like, and/or any other devices which enable a user to interact with the computing device 170.

As shown in FIG. 2, the computing device 170 includes the communication unit 202 coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with other components of the system 100 and specifically the devices 121, 141, and optionally the devices 161, via the networks 101, 102. In particular, the networks 101, 102 may include networks that are dedicated for usage by first responders; the communication unit 202 may include one or more transceivers 208 and/or wireless transceivers adapted for communication with such networks. For example, the networks 101, 102 may comprise one or more of a digital mobile radio (DMR) network, a Project 25 (P25) network, and a terrestrial trunked radio (TETRA) network, with the one or more transceivers 208 adapted accordingly.

However, the one or more transceivers 208 may be adapted to wirelessly communicate with any suitable network, including, but not limited to, one or more of: a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network, and the like.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The controller 220 may include ports (e.g. hardware ports) for coupling to other hardware components.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the computing device 170 is not a generic controller and/or a generic device, but a device specifically configured to implement functionality for managing talkgroups. For example, in some examples, the computing device 170 and/or the controller 220 specifically comprises a computer executable engine configured to implement functionality for managing talkgroups.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the computing device 170 as described herein are maintained, persistently, at the memory 222 and used by the controller 220, which makes appropriate utilization of volatile storage during the execution of such programming instructions.

Figure 3:
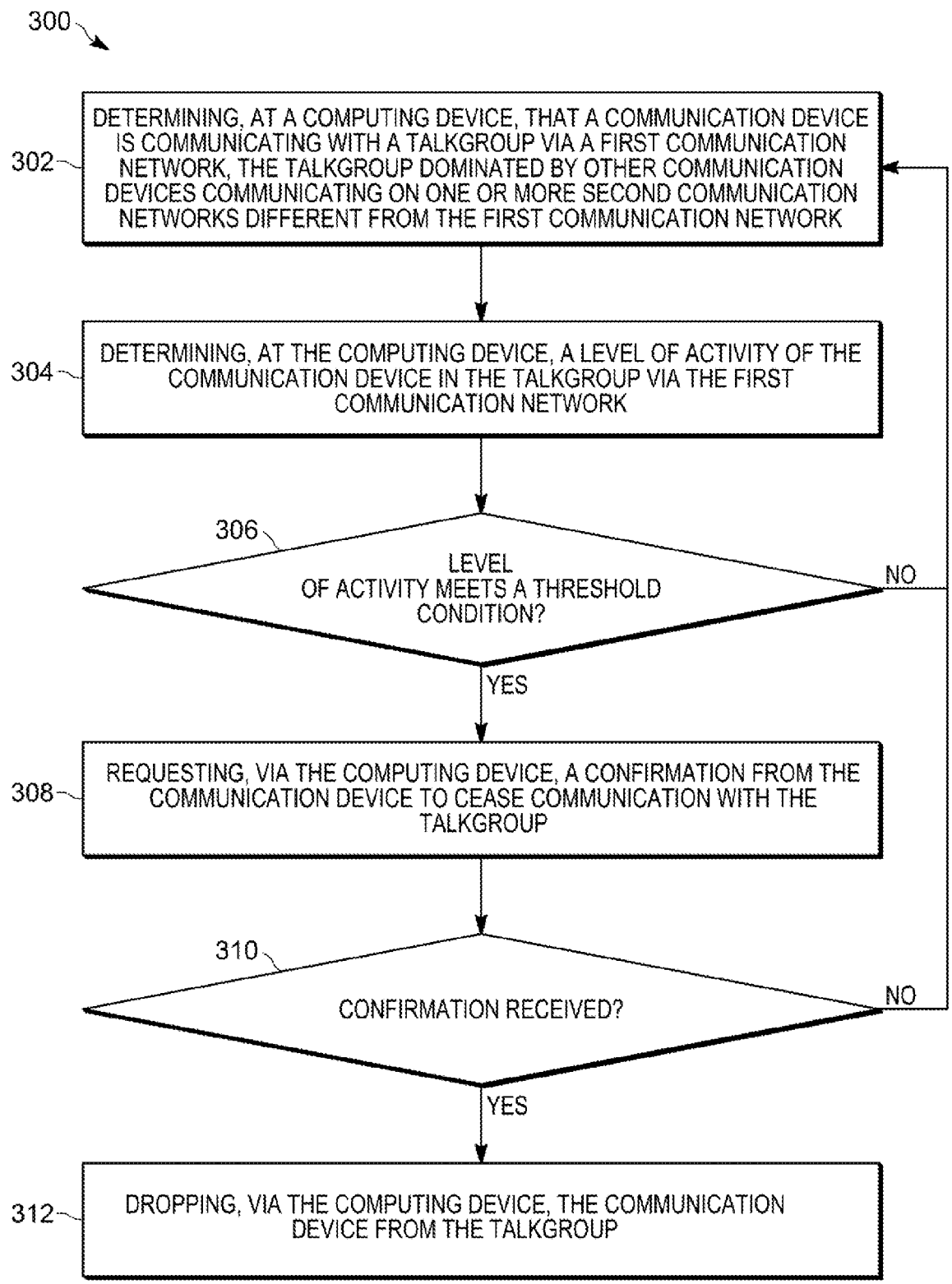
FIG. 3 is a flowchart of a method for managing talkgroups, in accordance with some examples.

In particular, the memory 222 stores instructions corresponding to the at least one application 223 that, when executed by the controller 220, enables the controller 220 to implement functionality for managing talkgroups including, but not limited to, the blocks of the method set forth in FIG. 3.

In illustrated examples, when the controller 220 executes the one or more applications 223, the controller 220 is enabled to: determine that a communication device 121 is communicating with a talkgroup 131 via a first communication network 101, the talkgroup 131 dominated by other communication devices 141 communicating on one or more second communication networks 102 different from the first communication network 101; determine a level of activity of the communication device 121 in the talkgroup 131 via the first communication network 101; and when the level of activity meets a threshold condition 224: request a confirmation from the communication device 121 to cease communication with the talkgroup 131; and when the confirmation is received, drop the communication device 121 from the talkgroup 131. For example, as depicted, the memory 222 further at least one threshold condition 224, as described in more detail below, though the at least one threshold condition 224 may alternatively be stored at the application 223.

The application 223 may include numerical algorithms to manage talkgroups, as described herein. However, the application 223 may include machine learning and/or deep-learning based algorithms, and the like, which have been trained and/or configured to manage talkgroups, as described herein. Furthermore, the application 223 may initially be operated by the controller 220 in a training mode to train the application 223 for managing talkgroups, as described herein.

For example, the application 223 may include, but is not limited to, one or more of: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments. However, any suitable machine learning algorithm and/or deep learning algorithm is within the scope of present examples.

While details of the devices 121, 141, 161 are not depicted, the devices 121, 141, 161 may have components similar to the computing device 170 adapted, however, for the functionality of the devices 121, 141, 161; for example, the devices 121, 141, 161 may have a communication unit, controller and the like adapted to communicate with each other via talkgroups as described above, as well as any suitable input devices, display screens, touchscreens, microphones, speakers etc.

Attention is now directed to FIG. 3, which depicts a flowchart representative of a method 300 for managing talkgroups. The operations of the method 300 of FIG. 3 correspond to machine readable instructions that are executed by the computing device 170, and specifically the controller 220 of the computing device 170. In the illustrated example, the instructions represented by the blocks of FIG. 3 are stored at the memory 222 for example, as the application 223. The method 300 of FIG. 3 is one way in which the controller 220 and/or the computing device 170 and/or the system 100 may be configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present examples.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the computing device 170 determines that a communication device 121 is communicating with the talkgroup 131 via the first communication network 101, the talkgroup 131 dominated by other communication devices 141 communicating on one or more second communication networks 102 different from the first communication network 101.

For example, the controller 220 and/or the computing device 170 may communicate with the devices 121, 141 to determine on which network 101, 102 the devices 121, 141 are communicating. The device 121 (and optionally one or more of the devices 141) may transmit, and/or periodically transmit, activity data to the controller 220 and/or the computing device 170, the activity data indicative of activity of the device and/or indicative of a network 101, 102 on which the device 121 is communicating. The activity data may include the device identifier 181 such that the computing device 170 may determine the associated role 182, assignment 183 and/or historical usage 184 on the second communication network 102.

Such activity data may further include indications of time periods that the device 121 has communicated on the talkgroup 131 and/or PTT presses (e.g. when the PTT button 125 is pressed and/or a numbers of times the PTT button 125 is pressed and/or actuated) and/or, similarly, actuation of one or more hardware devices of the communication device 121 (e.g. actuation of one or more of the PTT button 125, the volume control device 127, and the like), and/or a type of activity on the talkgroup 131.

An indication of a type of activity may be based on natural language processing (NLP) detection of words and/or phrase of speech transmitted by the device 121; in other words, the device 121 may include an NLP engine and/or algorithm and/or processor which detects key words and/or phrases related to activity. Hence, for example, the activity data may be used by computing device 170 to determine whether the device 121 is being used to transport a prisoner, whether or not the user 123 is engaged in an emergency situation, and the like. In some examples, however, a type of activity may be based on the role 182 and/or the assignment 183, as described in further detail below.

Hence, the device 121 may be generally configured to monitor activity at the device 121, in relation to the talkgroup 131 and/or the networks 101, 102, and transmit indications thereof to the computing device 170.

In yet further examples, the controller 220 and/or the computing device 170 may be configured to monitor activity on the talkgroup 131, as well as determine a network 101, 102 on which the activity is occurring, for example by monitoring traffic on the talkgroup 131 (e.g. traffic on the talkgroup 131 may be at least partially routed through the computing device 170 for analysis).

At a block 304, the controller 220 and/or the computing device 170 determines a level of activity of the communication device 121 in the talkgroup 131 via the first communication network 101 and, at a block 306, the controller 220 and/or the computing device 170 determines whether the level of activity meets a threshold condition 224. As described above, the level of activity may be determined from data transmitted to the computing device 170 by the device 121.

In some examples, the level of activity may comprise PTT presses (e.g. of the PTT button 125), and the at least one threshold condition 224 comprises a number of the PTT presses being below, and/or not exceeding, a threshold number. The number of PTT presses of the at least one threshold condition 224 may be preconfigured at the at least one threshold condition 224, stored at the memory 222, and may be any suitable number of PTT presses. The suitable number of PTT presses may further be cumulative (e.g. for comparing to a running total of the number of PTT presses) and/or a number of PTT presses in a given time period (e.g. a given number of PTT presses per hour and/or a rate of PTT presses). Hence, when the number of PTT presses is below the threshold number the at least one threshold condition 224 may be met.

Hereafter, any data of the at least one threshold condition 224, as described hereafter may at the at least one threshold condition 224, stored at the memory 222.

Similarly, in some examples the level of activity may comprise actuation of one or more hardware devices, at the communication device 121, associated with communication on talkgroups, and the at least one threshold condition 224 may comprise the actuation of the one or more hardware devices meeting given conditions. Such conditions may include, but is not limited to, numbers of actuations of one or more of the PTT button 125, the one or more volume control devices 127, and the like, being below, and/or not exceeding, a threshold number which may be any suitable number of actuations; the suitable number of actuations may further be cumulative (e.g. for comparing to a running total of the number of actuations) and/or a number of actuations in a given time period (e.g. a given number of actuations per hour and/or a rate of actuations). Hence, when the number of actuations is below the threshold number the at least one threshold condition 224 may be met.

However, in examples where the one or more hardware devices comprises the one or more volume control devices 127, the at least one threshold condition 224 may comprise the one or more volume control devices 127 indicating a volume level of the communication device 121 on the talkgroup 131 being at or below a threshold volume level. For example, the at least one threshold condition 224 may comprise the one or more volume control devices 127 being on mute and/or turned down below a given volume level.

In other examples, the level of activity may comprise usage of the talkgroup 131 by the communication device 121, and the at least one threshold condition 224 may comprise a time period of the usage being below, and/or not exceeding, a threshold time period. For example, the threshold time period may be any suitable time period; the suitable time period may further be cumulative (e.g. for comparing to a running total number of minutes of usage of the talkgroup 131 by the communication device 121) and/or a number of minutes of usage in a given time period (e.g. minutes per hour and/or a rate of usage). Hence, when the usage is below the threshold time period the at least one threshold condition 224 may be met.

Similarly, in other examples, the level of activity may comprise the historical usage 184 of the talkgroup 131 by the communication device 121 on the second network 102 (e.g. a home communication network), and the at least one threshold condition 224 may comprise a time period of the historical usage 184 being below, and/or not exceeding, a threshold time period. For example, the threshold time period may be any suitable time period; the suitable time period may further be cumulative (e.g. a running total number of minutes of the historical usage 184 of the talkgroup 131 by the communication device 121) and/or a number of minutes of the historical usage 184 in a given time period (e.g. minutes per hour and/or a rate of the historical usage 184). Hence, when the historical usage 184 is below the threshold time period the at least one threshold condition 224 may be met. In other words, the historical usage 184 may indicate how often the user 123 uses the talkgroup 131 which may indicate whether or not communication on the talkgroup 131 is critical to the user 123.

In other examples, the level of activity may comprise a type of the activity of the talkgroup 131, by the communication device 121, via the first communication network 101, and at least one threshold condition 224 may comprise the type of the activity being one or more predefined activities and/or not being one or more predefined activities. For example, at least one threshold condition 224 may comprise the type of the activity being the user 123 being on vacation, driving home from the office, off-duty, and the like; and/or at least one threshold condition 224 may comprise the type of the activity being the user 123 not transporting a prisoner, and the like.

In some examples, the type of the activity of the talkgroup 131 may be determined from NLP data, and the like, transmitted to the computing device 170 by the device 121, as described above. In these examples, the at least one threshold condition 224 may include keywords and the like which may be compared to the NLP data such that the at least one threshold condition 224 comprises the NLP data comprising one or more of the keywords (e.g. "Vacation" and/or "Prisoner", and the like).

In other examples, one or more of the type of activity and the at least one threshold condition 224 may be determined based on one or more of: the role 182 of the user 123 associated with the communication device 121; and the current assignment 183 associated with the communication device 121.

For example, the type of activity and/or the at least one threshold condition 224 may be based on the role 182, such as a patrol officer and/or the role 182 being below a given level in an organizational hierarchy. In these examples, the type of activity may be any talkgroup related activity undertaken by the device 121 in association with the role 182, and the at least one threshold condition 224 may comprise the role-related activity being one or more predefined activities and/or not being one or more predefined activities. For example, using the example of a patrol officer, the at least one threshold condition 224 may comprise the patrol officer-related activity being the user 123 sitting in a patrol car and/or being stationary, and/or the at least one threshold condition 224 may comprise the patrol officer-related activity being the user 123 not being stationary and/or not moving above a threshold speed (e.g. the user 123 is involved in a high speed chase) and/or the user 123 not being in a "man-down" situation. Indeed, in these examples, it is understood that the device 121 may include, and/or is in communication with, a speed-determining sensor, a man-down sensor, and the like. However, the activity may be detected via keywords determined using an NLP engine at the device 121.

Similarly, the type of activity and/or the at least one threshold condition 224 may be based on the assignment 183, such as the user 123 being off-duty and/or on vacation and/or transporting a prisoner. In these examples, the type of activity may be any talkgroup related activity undertaken by the device 121 in association with the assignment 183, and the at least one threshold condition 224 may comprise the assignment-related activity being one or more predefined activities and/or not being one or more predefined activities. For example, using the example of the user 123 being off-duty and/or on vacation, the at least one threshold condition 224 may comprise the assignment-related activity being that the user 123 is off-duty and/or on vacation, and/or the at least one threshold condition 224 may comprise the assignment-related activity being that the user 123 is not assigned to transport a prisoner.

Indeed, the activity, the level thereof, and the at least one threshold condition 224 may be any suitable combination of one or more activities, levels thereof, and/or threshold conditions.

When the level of activity meets a threshold condition (e.g. a "YES" decision at the block 306), at a block 308, the controller 220 and/or the computing device 170 requests a confirmation from the communication device 121 to cease communication with the talkgroup 131.

For example, the computing device 170 may transmit a request to the communication device 121 requesting permission for the computing device 170 to drop the device 121 from the talkgroup 131. The request may comprise data for providing an aural and/or a visual notification at the device 121, which may be played at a speaker of the device 121 and/or rendered at a display screen thereof. The user 123 may hear and/or see the notification and respond accordingly, for example by operating the device 121 to transmit an indication of permission (e.g. "YES" and/or "CONFIRM", or "NO", and the like) to the computing device 170. For example user 123 may operate and/or interact with any suitable input device of the device 121, such as a microphone, a touchscreen, the PTT button 125 and the like to initiate transmission of an indication of permission (e.g. the user 123 may speak "YES" and/or "CONFIRM", or "NO" into a speaker, press a button of the device 121, and/or a region of a touch screen of the device 121 to indicate YES" or "NO", operate the PTT button in a given PTT press pattern to indicate YES" or "NO" (e.g. one PTT press for "YES", two successive PTT presses for "NO") and the like). The indication of permission is transmitted to the computing device 170 via the first base station 111 and the first network 101.

At a block 310, the controller 220 and/or the computing device 170 determines whether the confirmation is received. For example, the controller 220 and/or the computing device 170 may receive the indication of permission from the device 121 and determine whether the indication of permission is indicative of "YES" (e.g. a positive confirmation that the communication device 121 is to cease communication with the talkgroup 131) or "NO" (an indication that the communication device 121 is not to cease communication with the talkgroup 131). Alternatively, the controller 220 and/or the computing device 170 may not receive a reply and/or a confirmation from the device 121 within a given time period; such a lack of reply may also be indicative of an indication that the communication device 121 is not to cease communication with the talkgroup 131.

When the confirmation is received (e.g. a "YES" decision at the block 310), at a block 312, at a block 312, the controller 220 and/or the computing device 170 drops the communication device 121 from the talkgroup 131.

For example, the computing device 170 may transmit a command to control components at one or more of the base station 111, and/or the networks 101, 102 to drop the communication device 121 from the talkgroup 131. Alternatively, the computing device 170 may transmit a command to the device 121 to cause the device 121 to drop itself from the talkgroup 131 (e.g. a transceiver of the device 121 may drop a channel with the base station 111 on which communications with the talkgroup 131 are occurring).

Regardless, dropping the device 121 from the talkgroup 131 frees bandwidth at least at the base station 111 such that devices 161 may more easily communicate, for example over the talkgroup 152.

Returning briefly to the block 306 and the block 310, when a level of activity does not meet at least one threshold condition 224 at the block 306 and/or when a confirmation is not received at the block 310m (e.g. "NO" decision occurs at the block 306 and/or the block 310), as depicted, the controller 220 and/or the computing device 170 may repeat the method from the block 302 (and/or alternatively from the block 304).

Attention is next directed to FIG. 4, FIG. 5, FIG. 6, and FIG. 7 which depict an example of the method 300. FIG. 4, FIG. 5, FIG. 6, and FIG. 7 is substantially similar to FIG. 1, with like components having like numbers.

Figure 4:
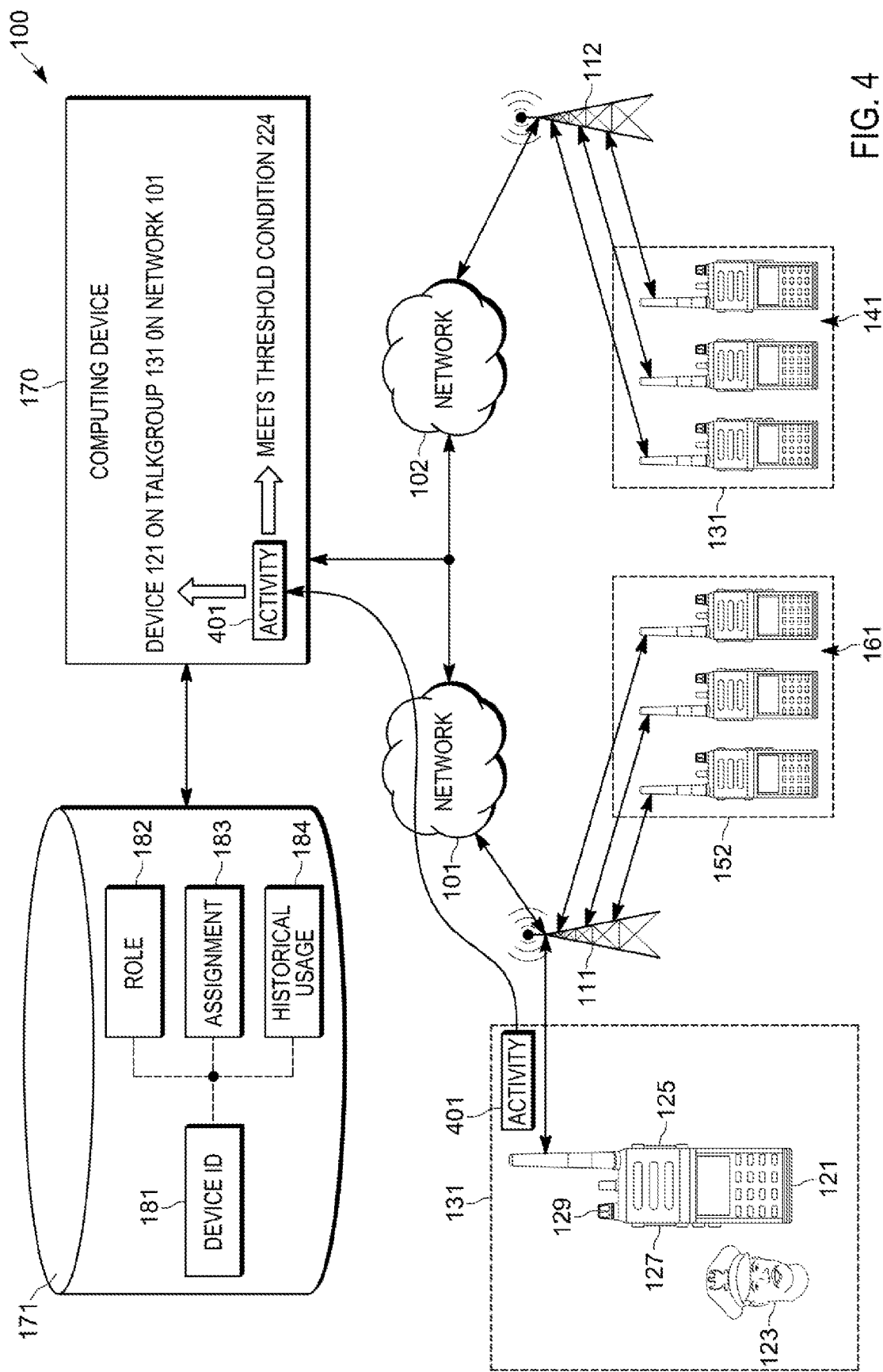
FIG. 4 depicts the system of FIG. 1 implementing a portion of a method for managing talkgroups, in accordance with some examples.

Attention is next directed to FIG. 4 which depicts the computing device 170 receiving activity data 401 from the device 121, the activity data 401 indicative of activity at the device 121 as described above. The activity data 401 may further be indicative of the device 121 communicating on the talkgroup 131 via the first network 101. While not depicted, the computing device 170 may receive similar activity data from one or more of the devices 141. Regardless, in the depicted example, the computing device 170 determines (e.g. at the block 302 of the method 300), for example from the activity data 401, that the device 121 is communicating on the talkgroup 131 via the first network 101.

It is further understood from FIG. 4 that the computing device 170 determines (e.g. at the block 304 of the method 300) a level of activity indicated by the activity data 401, and that the level of activity indicated by the activity data 401 meets at least one threshold condition 224 (e.g. a "YES" decision occurs at the block 306 of the method 300).

Figure 5:
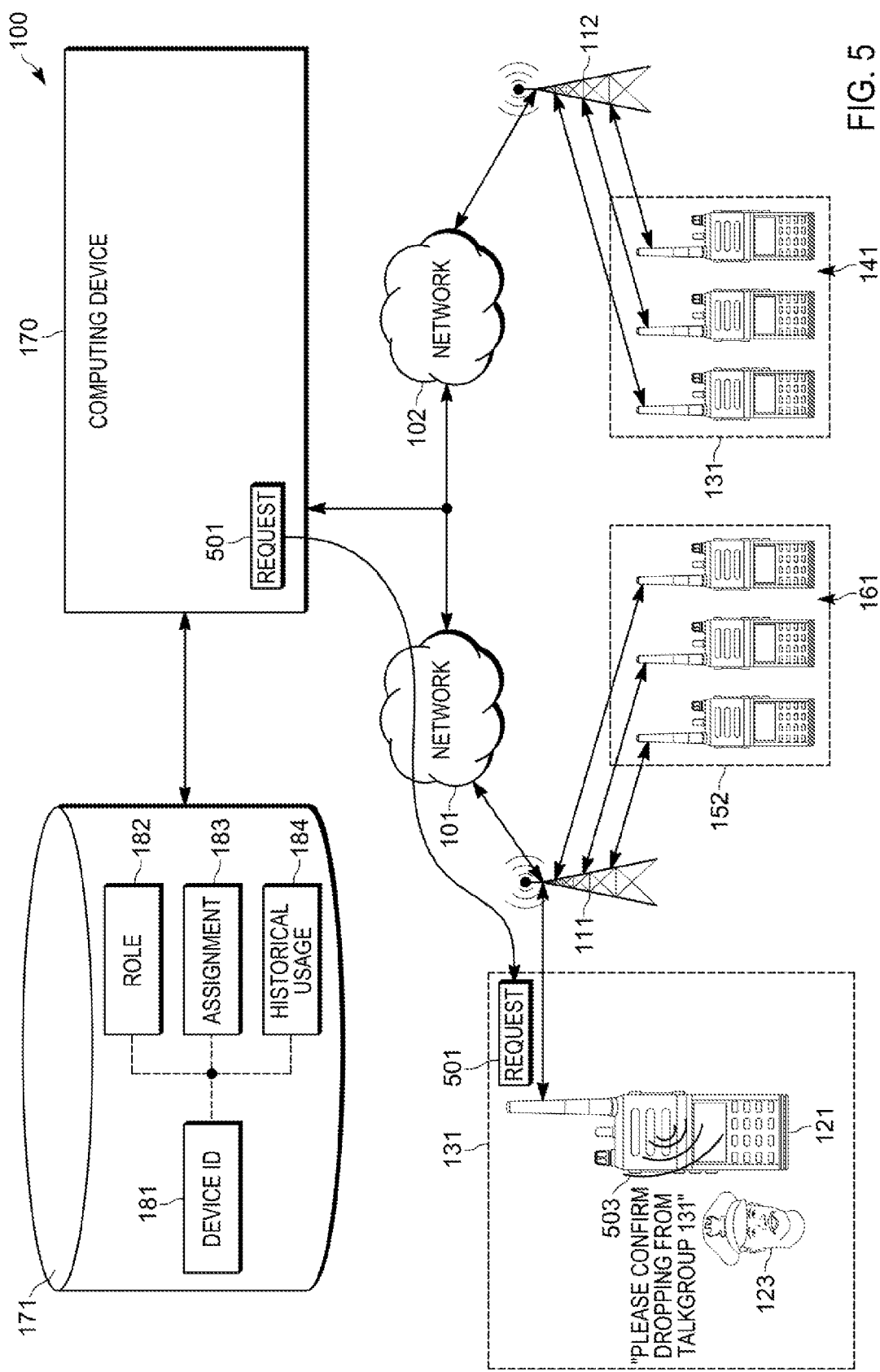
FIG. 5 depicts the system of FIG. 1 implementing a further portion of the method for managing talkgroups, in accordance with some examples.

Attention is next directed to FIG. 5 which depicts the computing device 170 transmitting a request 501 (e.g. at the block 308 of the method 300) to the device 121, the request 501 comprising a request for a confirmation to cease communication with the talkgroup 131. FIG. 5 further depicts the device 121 playing (e.g. via a speaker of the device 121) sound 503 "Please Confirm Dropping From Talkgroup 131" which may be text in the request 501 converted to sound via a text-to-speech engine at the device 121. When volume of the device 121 is on mute, receipt of the request 501 may cause the device 121 to at least temporarily unmute the volume to play the sound 503.

Alternatively, the text in the request may be rendered at a display screen of the device 121.

Figure 6:
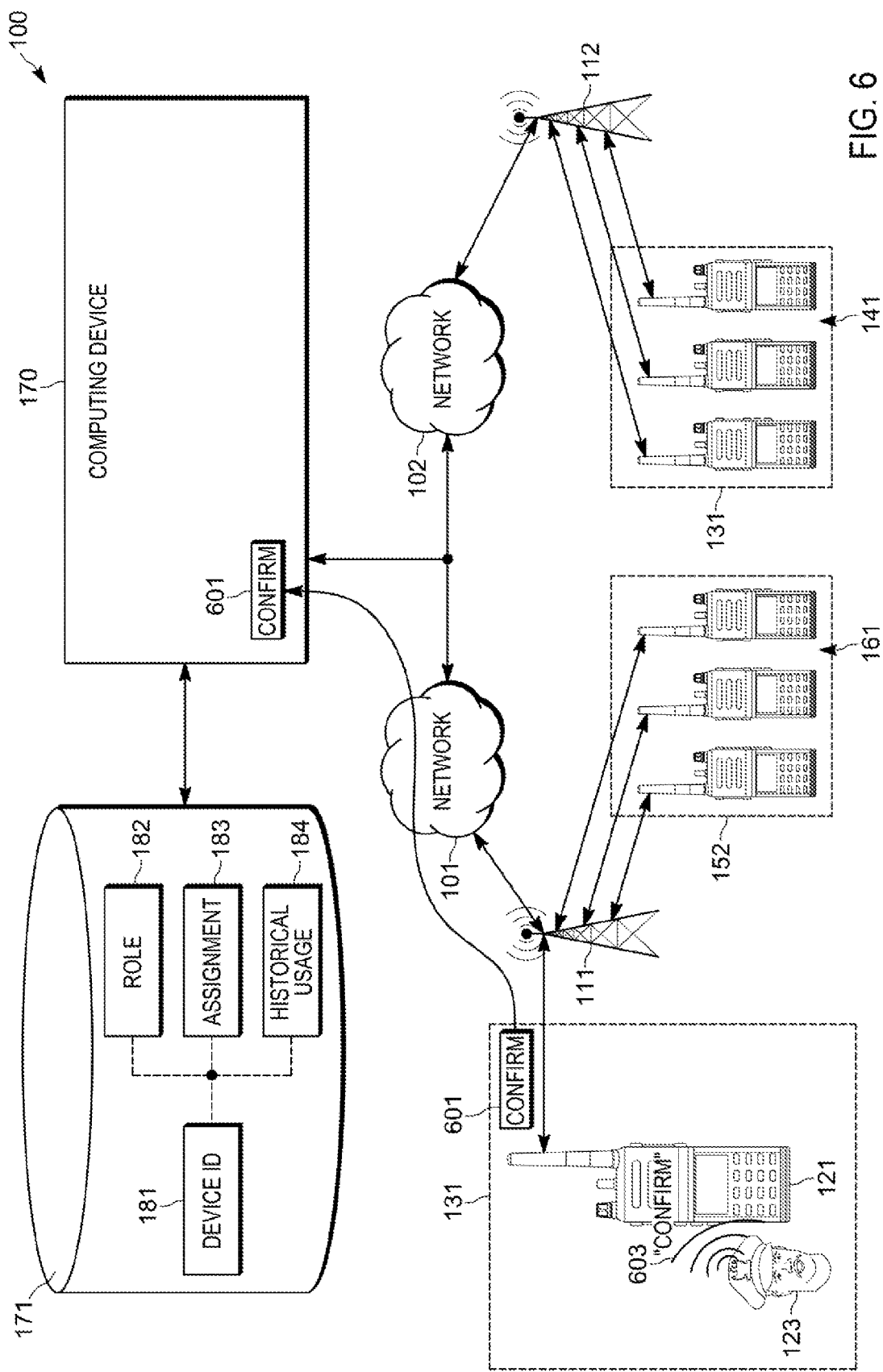
FIG. 6 depicts the system of FIG. 1 implementing yet a further portion of the method for managing talkgroups, in accordance with some examples.

Attention is next directed to FIG. 6 which depicts the computing device 170 receiving a confirmation 601 (e.g. a "YES" decision occurs at the block 310 of the method 300) from the device 121, the confirmation 601 comprising a confirmation to cease communication with the talkgroup 131. FIG. 6 further depicts the user 123 speaking sound 603 "Confirm" into a microphone of the device 121, which may be converted to the confirmation 601 via an NLP engine and/or speech-to-text engine at the device 121. Alternatively, the confirmation 601 may be generated via the user 123 interacting with a touchscreen of the device 121, and/or any other suitable input device.

Figure 7:
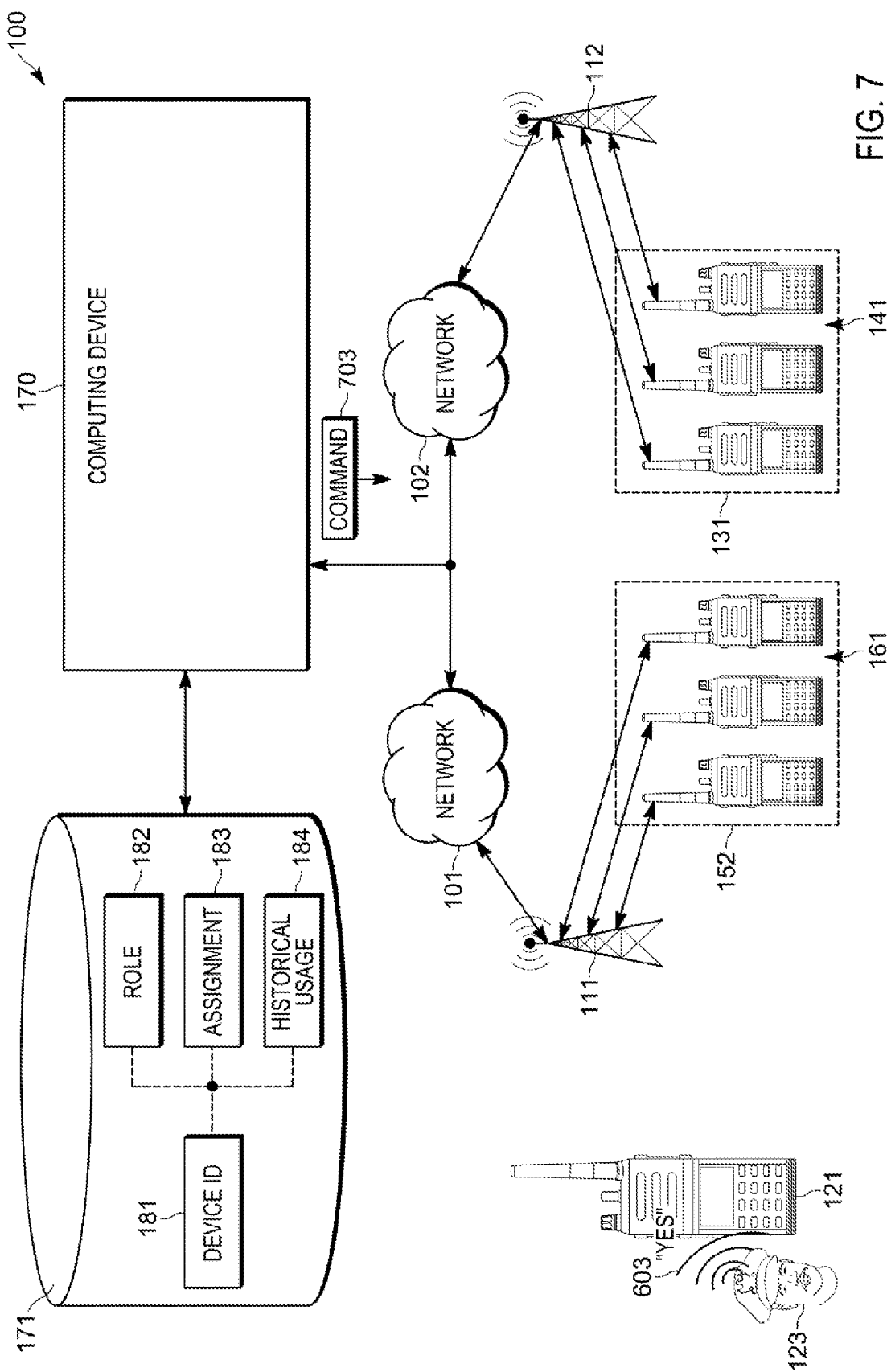
FIG. 7 depicts the system of FIG. 1 completing implementation of the method for managing talkgroups, in accordance with some examples.

Attention is next directed to FIG. 7 which depicts the computing device 170 dropping (e.g. at the block 312 of the method 300) the device 121 from the talkgroup 131, for example by transmitting a command 703 to one or more of components of one or more of the networks 101, 102 and/or the device 121 to cause the device 121 to be dropped from the talkgroup 131. Indeed, in FIG. 7, the device 121 is no longer communicating with the talkgroup 131 and a channel and/or wireless communication link between the device 121 and the first base station 111 has been dropped.

While specific functionality of the computing device 170 has been described, the computing device 170 may have any suitable functionality including, but not limited to:

Implementing the method 300 when the bandwidth capacity at the first base station 111 is at or above a threshold capacity (e.g. 95% of maximum and/or any other suitable threshold capacity) and otherwise not implementing the method 300.

Removing a device 161 from the talkgroup 152 depending on the role 182 and/or the assignment 183 associated with the device 121 and/or the user 123. For example, when the role 182 is a given role (e.g. such as a captain, and the like), and/or the assignment 183 is a given assignment (e.g. prisoner transport), and bandwidth capacity at the first base station 111 is at or above a threshold capacity (e.g. 95% of maximum), the computing device 170 may remove a device 161 from the talkgroup 152 associated with a lower role (e.g. of a user thereof), relative to the role 182, and/or associated with a lower assignment, relative to the assignment 183, in order to reserve and/or recover bandwidth capacity and/or channel capacity at the first base station 111.

Moving a device 161 from the talkgroup 152 to another talkgroup and/or another base station of the first network 101 to in order to reserve and/or recover bandwidth capacity and/or channel capacity at the first base station 111. Such movement may be based on bandwidth capacity at the first base station 111 being at or above a threshold capacity (e.g. 95% of maximum), and/or the role 182 and/or the assignment 183 associated with the device 121 and/or the user 123, as described above.

Indeed, the computing device 170 may have any suitable functionality to drop and/or move devices 121, 141, 161, as described above, based on any suitable conditions and/or threshold conditions.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . ." and "one or more . . ." language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   determining, at a computing device, that a communication device is communicating with a talkgroup via a first communication network, the talkgroup dominated by other communication devices communicating on one or more second communication networks different from the first communication network;
   determining a level of activity of the communication device in the talkgroup via the first communication network; and
   when the level of activity meets a threshold condition:
      requesting a confirmation from the communication device to cease communication with the talkgroup; and
      when the confirmation is received, dropping the communication device from the talkgroup, wherein dropping the communication device from the talkgroup comprises removing the communication device from the talkgroup, such that the communication device is no longer communicating with the talkgroup.

2. The method of claim 1, wherein the level of activity comprises push-to-talk (PTT) presses, and the threshold condition comprises a number of the PTT presses not exceeding a threshold number.

3. The method of claim 1, wherein the level of activity comprises an actuation of one or more hardware devices, at the communication device, associated with communication on talkgroups, and the threshold condition comprises the actuation of the one or more hardware devices meeting given conditions.

4. The method of claim 3, wherein the one or more hardware devices comprises one or more volume control devices, and the threshold condition comprises the one or more volume control devices indicating a volume level of the communication device on the talkgroup being at or below a threshold volume level.

5. The method of claim 1, wherein the level of activity comprises usage of the talkgroup by the communication device and the threshold condition comprises a time period of the usage not exceeding a threshold time period.

6. The method of claim 1, wherein the level of activity comprises historical usage of the talkgroup, by the communication device, via a home communication network, and the threshold condition comprises a time period of the historical usage not exceeding a threshold time period.

7. The method of claim 1, wherein the level of activity comprises a type of the activity of the talkgroup, by the communication device, via the first communication network, and the threshold condition comprises the type of the activity being one or more predefined activities.

8. The method of claim 7, wherein one or more of the type of activity and the threshold condition is determined based on one or more of: a role of a user associated with the communication device; and a current assignment associated with the communication device.

9. The method of claim 1, wherein dropping the communication device from the talkgroup further comprises dropping a channel between the communication device and a base station of the first communication network.

10. A computing device comprising:
    communication unit; and
    a controller configured to:
       determine that a communication device is communicating with a talkgroup via a first communication network, the talkgroup dominated by other communication devices communicating on one or more second communication networks different from the first communication network;
       determine a level of activity of the communication device in the talkgroup via the first communication network; and
       when the level of activity meets a threshold condition:
          request a confirmation from the communication device to cease communication with the talkgroup; and
          when the confirmation is received, drop the communication device from the talkgroup, wherein dropping the communication device from the talkgroup comprises removing the communication device from the talkgroup, such that the communication device is no longer communicating with the talkgroup.

11. The device of claim 10, wherein dropping the communication device from the talkgroup further comprises dropping a channel between the communication device and a base station of the first communication network.

12. The computing device of claim 10, wherein the level of activity comprises push-to-talk (PTT) presses, and the threshold condition comprises a number of the PTT presses not exceeding a threshold number.

13. The computing device of claim 10, wherein the level of activity comprises an actuation of one or more hardware devices, at the communication device, associated with communication on talkgroups, and the threshold condition comprises the actuation of the one or more hardware devices meeting given conditions.

14. The computing device of claim 13, wherein the one or more hardware devices comprises one or more volume control devices, and the threshold condition comprises the one or more volume control devices indicating a volume level of the communication device on the talkgroup being at or below a threshold volume level.

15. The computing device of claim 10, wherein the level of activity comprises usage of the talkgroup by the communication device and the threshold condition comprises a time period of the usage not exceeding a threshold time period.

16. The computing device of claim 10, wherein the level of activity comprises historical usage of the talkgroup, by the communication device, via a home communication network, and the threshold condition comprises a time period of the historical usage not exceeding a threshold time period.

17. The computing device of claim 10, wherein the level of activity comprises a type of the activity of the talkgroup, by the communication device, via the first communication network, and the threshold condition comprises the type of the activity being one or more predefined activities.

18. The computing device of claim 17, wherein one or more of the type of activity and the threshold condition is determined based on one or more of: a role of a user associated with the communication device; and a current assignment associated with the communication device.

19. The method of claim 1, wherein dropping the communication device from the talkgroup further comprises dropping a communication link between the communication device and a base station of the first communication network.

20. The device of claim 10, wherein dropping the communication device from the talkgroup further comprises dropping a communication link between the communication device and a base station of the first communication network.

* * * * *